(12) United States Patent
Sarofim et al.

(10) Patent No.: US 7,682,819 B2
(45) Date of Patent: Mar. 23, 2010

(54) INSTRUMENT FOR HEATING AND COOLING

(75) Inventors: Emad Sarofim, Hagendorn (CH); Goran Savatic, Kuessnacht am Rigi (CH)

(73) Assignee: Roche Molecular Systems, Inc., Pleasanton, CA (US)

( * ) Notice: Subject to any disclaimer, the term of this patent is extended or adjusted under 35 U.S.C. 154(b) by 301 days.

(21) Appl. No.: 11/777,164

(22) Filed: Jul. 12, 2007

(65) Prior Publication Data
US 2008/0026430 A1   Jan. 31, 2008

(30) Foreign Application Priority Data
Jul. 14, 2006   (EP)   .................................. 06014675

(51) Int. Cl.
*C12M 1/34*   (2006.01)
*C12M 3/00*   (2006.01)

(52) U.S. Cl. .............. 435/287.2; 435/287.1; 435/287.3; 435/303.1; 435/6

(58) Field of Classification Search .................. 435/6, 435/287.1–287.2, 303.1, 809
See application file for complete search history.

(56) References Cited

U.S. PATENT DOCUMENTS

| | | | |
|---|---|---|---|
| 6,300,124 B1 | 10/2001 | Blumenfeld et al. | |
| 6,428,749 B1 * | 8/2002 | Kajiyama et al. | 422/68.1 |
| 6,509,186 B1 * | 1/2003 | Zou et al. | 435/286.1 |
| 6,572,830 B1 * | 6/2003 | Burdon et al. | 422/186.29 |
| 6,633,785 B1 | 10/2003 | Kashara et al. | |
| 7,189,367 B2 * | 3/2007 | Yamamoto et al. | 422/100 |
| 7,244,913 B2 * | 7/2007 | Murakami et al. | 219/385 |
| 7,473,030 B2 * | 1/2009 | Bruce et al. | 374/31 |
| 2003/0008286 A1 | 1/2003 | Zou et al. | |
| 2005/0282221 A1 * | 12/2005 | Barlocchi et al. | 435/6 |
| 2007/0295705 A1 * | 12/2007 | Geisbauer | 219/162 |

FOREIGN PATENT DOCUMENTS

| | | | |
|---|---|---|---|
| EP | 1-123739 | A1 | 8/2001 |
| EP | 1-314472 | A1 | 5/2003 |
| EP | 1-541237 | A2 | 6/2005 |
| WO | WO 98/38487 | A2 | 9/1998 |
| WO | WO 03/031063 | A2 | 4/2003 |
| WO | WO 03/075111 | A1 | 9/2003 |
| WO | WO 2005/115624 | A1 | 12/2005 |

* cited by examiner

*Primary Examiner*—Walter D Griffin
*Assistant Examiner*—Shanta G Doe
(74) *Attorney, Agent, or Firm*—Townsend and Townsend and Crew LLP

(57) ABSTRACT

An instrument and method is provided that conveniently allows rapid amplification of nucleic acids.

16 Claims, 3 Drawing Sheets

INSTRUMENT FOR HEATING AND COOLING

CROSS-REFERENCES TO RELATED APPLICATIONS

The present application claims the benefit of EP Appl. No. 06014675, filed Jul. 14, 2006, the entire contents of which is hereby incorporated herein by reference in its entirety.

FIELD OF THE INVENTION

Subject of the present invention is an instrument for heating and cooling an object in a controlled manner, a method for conducting a thermal profile, a method for amplifying nucleic acids, a system for heating a liquid and a system for determining nucleic acids.

BACKGROUND OF THE INVENTION

The invention is useful in the field of health care, where reliable analysis of samples for components contained therein is needed. Chemical reactions needing heating are well known, for example from molecular diagnostics, where nucleic acids are known to denature, i.e. to become single stranded from a hybrid of two strands, by applying heat above the melting temperature of the hybrid.

A method that uses reaction cycles including such denaturation step is the polymerase chain reaction (PCR). This technology has revolutionized the field of nucleic acid treatment, particularly the analysis of nucleic acids, by providing a tool to increase the amount of nucleic acids of a particular sequence from negligible to detectable amounts. PCR is described in EP 0 201 184 and EP 0 200 362.

An instrument for performing thermocycles in controlled manner on samples in tubes using heating and cooling an extended metal block is disclosed in EP 0 236 069.

Methods for heating a composition of matter are also known. For example in US 2002/0061588 there is described a method for heating a nucleic acid by attaching it to a nanoparticle and applying energy to this nanoparticle. By the heat, nucleic acid hybrids on the surface of the modulator are denatured and one of the strands can dissociate into the surrounding liquid. However, this method is quite inefficient regarding heating and amplification.

Heating of PCR mixtures is presently mainly done using Peltier elements with active heating and cooling. Those require complex electronics compared to systems with active heating and passive cooling.

In US 2004/0129555 there is described a method for heating a mixture containing a dye using a pulsed LASER.

In U.S. Pat. No. 6,633,785 there is described a method for heating a micro-tube using either resistance heating or inductive heating.

In U.S. Pat. No. 6,602,473 there is disclosed a microfabricated reaction chamber made from silicon. The device has inlet and outlet ports and can be used to conduct PCR reactions when inserted into an instrument. The system does not allow sensitive and quick temperature control.

In WO 98/39487 there is described an apparatus for holding a device having a chamber, said apparatus comprising heating or cooling plates arranged on opposite side walls of a flat device in case the device is inserted into said apparatus.

The temperature changes provided by the prior art instruments were relatively slow. Thus, there was a need to provide faster amplification of nucleic acids.

BRIEF SUMMARY OF THE INVENTION

A first subject of the invention is an instrument for heating and cooling an object in a controlled manner, said instrument comprising in the following order
 a substantially flat temperature sensor element,
 a substantially flat, rigid, heat conducting substrate,
 a substantially flat resistance heater,
 a substantially flat isolation layer, and
 a cooling element.

A second subject of the invention is a method for conducting a thermal profile in a device comprising
 heating and cooling the device in an instrument according to the invention.

A third subject of the invention is a system for determining a nucleic acid in a sample comprising an instrument according to the invention and a device containing said sample.

A fourth subject of the invention is a method for amplification of nucleic acids comprising
 a) providing a sample containing the nucleic acids in a device in an instrument according to the invention, and
 b) subjecting said sample in said device to thermocycles.

A fifth subject of the invention is a system for heating a sample containing
 a device containing one or more chambers for containing said sample, and
 an instrument according to the invention.

DETAILED DESCRIPTION OF THE INVENTION

Figure 1:
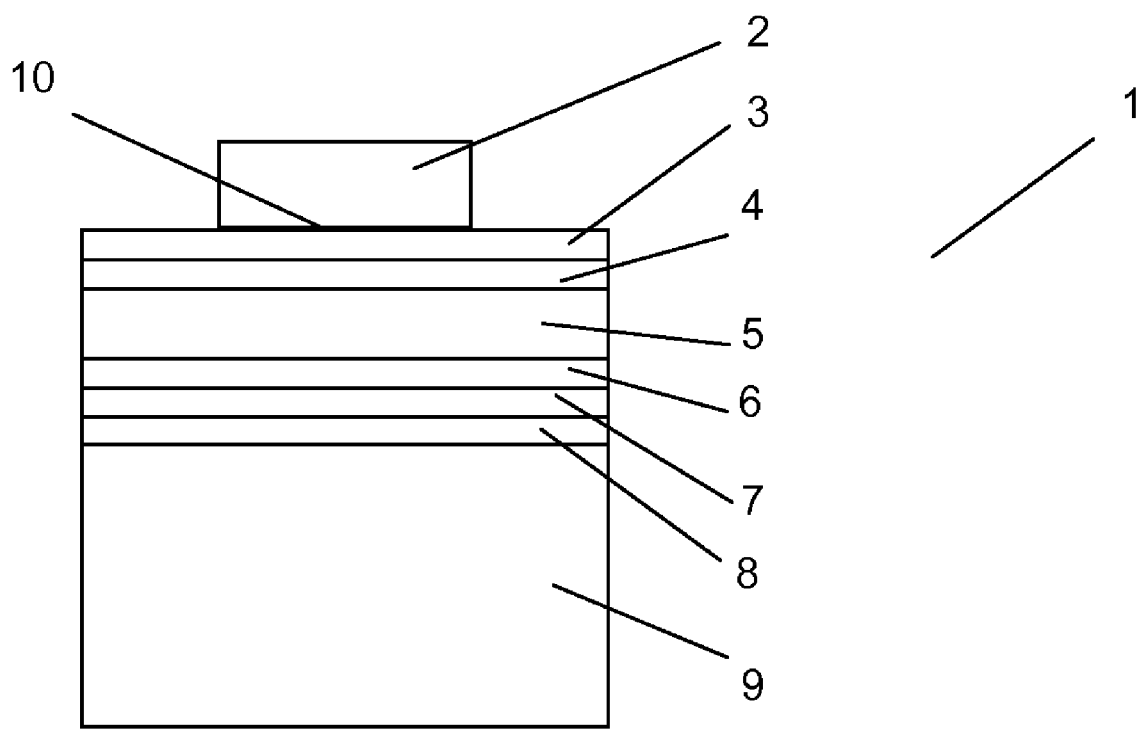
FIG. 1 shows an exemplary schematic assembly of an instrument according to the invention. The reference numerals are as follows: instrument (1); device containing the sample (2); protective cover layer of the sensor (3); temperature sensor structure/element (4); heat conducting substrate (5); heater (6); heater cover layer (7); thermal isolation layer (8); cooling element (9); heat transfer surface (10).

Methods for the amplification of nucleic acids are known. They are intended to create a large amount of nucleic acids based upon the initial presence of a target nucleic acid serving as a template for the activity of an enzyme capable of replicating a sequence of bases within said target nucleic acid. The replicon itself is used as a target for a replication of a sequence, e.g. the sequence of bases that were already subject of the first replication. Thus, a huge number of nucleic acids having an identical sequence are created. This allows very sensitive detection of the target nucleic acid.

A well established method for the amplification of nucleic acids is the polymerase chain reaction (PCR) method as disclosed in EP 200362. In this method, a reaction mixture is subjected to repeated cycles of a thermal profile, the temperatures being adapted to effect annealing primers to the target nucleic acid, extending said annealed primer using said target nucleic acid as a template and separating the extension product from its template.

In a first step, a liquid containing the nucleic acids is provided. The liquid may be any liquid that contains a nucleic acid to be amplified. Furthermore, this liquid contains the reagents necessary for the amplification of the nucleic acids. Those reagents are well known for each amplification method and can include an agent for extending a primer, for example a template dependent DNA- or RNA-polymerase and building blocks that should be attached to the primer for extension, e.g. nucleotides. Furthermore, the mixture will contain reagents useful to establish conditions for the extension reaction, like buffers and cofactors, e.g. salts, for the enzyme used.

In further steps, the temperature is adjusted to allow for denaturation of double stranded nucleic acids, annealing of primers to the single strands, and extension of the primers annealed. The extension reaction will be performed at a temperature where the polymerase is active. Optionally, a thermostable and thermoactive polymerase is used. The double strands formed are separated by denaturation as indicated above.

This process can be performed using an instrument according to the invention. For this, the sample containing the nucleic acids is contained in a chamber of a device inserted or to be inserted into the instrument according to the invention as an object for getting cooled and heated.

A first component of an instrument according to the present invention is at least one substantially flat temperature sensor element. Substantially flat in this connection means that the sensor contains a surface not raising above its average environment by more than 1 mm, in some embodiments not raising above its average environment by more than 0.1 mm. This has the advantage of good thermal contact of a surface of said device to be heated to the sensor element and the adjacent layers. It is designed to measure the temperature at the location where it is placed. Such elements are well known to those skilled in the art, and can be resistance elements. Useful sensors are between 0.01 μm and 10 μm, for example, between 0.8 μm and 1.2 μm, thick. An exemplary, commercially available sensor element is 1 μm thick and is available from companies such as Heraeus Sensor Technology (Kleinostheim, Germany), JUMO GmbH & Co. KG (Fulda, Germany) or Innovative Sensor Technology IST AG (Wattwil, Switzerland). The elements have connectors for permanently or reversibly connecting the sensor element to wires leading to a controlling unit. The sensor element can be manufactured according to known methods. It can be produced independently and thereafter closely fixed to the other components by known means, for example gluing. The sensor element can be made by sputtering a layer of the material to the accompanying layer. Such methods to apply thin layers are also known. Materials for the sensor element can be, e.g., nickel and platinum. For example, the sensor element can be made from platinum or mixtures of platinum with other noble metals.

The temperature sensor element can be protected against mechanical and chemical destruction by a cover layer. This cover layer can be made from glass and can be between 1 μm and 25 μm thick. It can be produced by thick film deposition well known in the art. In addition, the layer optionally has a low electric conductivity and high thermal conductivity.

The temperature sensor element optionally is designed to adequately correlate with the temperature in the sample. This can be achieved by designing the shape of the element such that it closely resembles the shape of the device containing the sample. In some embodiments, the contact surfaces of the sensor element including the protective cover and the contact surface of the device are in close contact. Due to the defined arrangement of the instrument and the device, the temperature in the sample can be extrapolated with high certainty from the temperature measured in the sensor element.

The result of the temperature measurement is used for controlling the heating and cooling process in the instrument.

The second component of the instrument according to the invention is a substantially flat, rigid, heat conducting substrate. This substrate can be constructed from materials having a coefficient of thermal conductivity of between $2 \times 10^3$ and $5 \times 10^6$ W/m$^2$K. Furthermore, said substrate is flat and has a thickness of less than 0.1 and 10 mm, for example, between 0.25 and 2 mm. The substrate has the characteristic to be rigid, i.e. stable to substantial mechanical distortion. Furthermore, the heat conducting substrate can be made of an electrically isolating material having an electric conductivity of less than $0.1 \, \Omega^{-1} m^{-1}$. In addition, the substrate property optionally can have a low thermal time constant (density×heat capacity/thermal conductivity), for example, of less than $10^5$ s/m$^2$. Appropriate materials are selected from the group consisting of alumina, copper, aluminum oxide, aluminum nitride, silicon nitride, silicon carbide, sapphire, copper, silver, gold, molybdenum and brass. The heat conducting substrate can be made from materials with a low electric conductivity, e.g. electrically isolating materials, such as materials having an electric conductivity below $10^{-9} \, \Omega^{-1} m^{-1}$. Useful materials include ceramic materials, for example, aluminum oxide, aluminum nitride, silicon nitride, silicon carbide and sapphire.

This substrate can also be manufactured according to known methods. In some embodiments, the substrate is manufactured by sintering of ceramics. The substrate may be prepared in a form, optionally a re-useable form, resembling the shape of the substrate, or may be cleaved into pieces of appropriate dimensions after the sinter process.

The third component of the instrument of the invention is the heater. The heater can be substantially flat, and can be a resistance heater. Such heaters are generally known in the art. In some embodiments, the heater is a layer of material with a high electrical resistance, e.g. selected from the group consisting of ruthenium oxide, silver, gold, platinum, copper, palladium and other metals. In some embodiments, the material is ruthenium oxide. The layer optionally has a thickness of between 10 μm and 30 μm, for example, between 15 μm and 20 μm. The heater can have a heating intensity of between 15 and 40 W/cm$^2$.

The heating layer is optionally prepared by coating or screen printing a paste of the material in particular form and heating said composite to a temperature sufficient for the particular material to sinter. In some embodiments, the material thereby adheres to the layer on which it is sintered.

In some embodiments, the heater element is protected against mechanical and chemical destruction by a cover layer. This cover layer can be made from glass or glass ceramics and can be between 1 μm and 25 μm thick. It is optionally produced by thick film deposition well known in the art. In addition, the layer optionally has a low electric conductivity and high thermal conductivity.

The fourth component is a substantially flat isolation layer separating the heater from the cooling element. The function of said isolation layer is to provide appropriate heat transfer from the heater to the cooling element and vice versa. This heat transfer on the one hand must be high enough to ensure sufficient cooling of the device—and thus, the sample—through the layers separating the device from the cooling element, but on the other hand must be low enough to not foreclose quick heating of the sample by the heater during the transient phase (heat ramp) from a lower to a higher temperature. The thickness of the isolation layer can be adapted to achieve high heating ramps and slower cooling ramps or vice versa. Therefore, the thermal conductivity should be between 0.5 W/(m*K) and 2 W/(m*K), for example, between 0.8 W/(m*K) and 1.2 W/(m*K). These values depend on the power density of the heater, the thickness of the isolation layer and the cooling capacity of the cooling element. In some embodiments, values for these parameters are 40 W/cm² for the heater power density at a thickness of 200 μm of the isolation layer.

The material for the isolation layer can be selected from the group consisting of epoxides or glass or glass ceramics. In some embodiments, the isolation layer is made of composites of particular materials, e.g. alumina microparticles in epoxy. In some embodiments, the isolation layer is made of composites of aluminum oxide in glue or epoxy resins. In some embodiments, the particular material is homogeneously distributed within the layer.

The layer can again be applied to the neighboring layers in generally known manners. In some embodiments, the material is coated as a paste and then sintered at between 150 and 180° C. for 1.5 to 2 hours to solidify. The resistance of such epoxide based layers is up to 450° C.

In certain aspects the isolation layer may also be made up from more than one layer. In one embodiment, the isolation layer comprises three layers, wherein the first and the third layer are isolation layers as described above and the middle layer is an intermediate layer made up from thermally conductive material such as metals, ceramic, crystals or polymers (e.g., aluminum, copper, steel, alumina, aluminum nitride, silicon carbide, silicon nitride, sapphire, diamond, polyimide). Such an embodiment is advantageous as two of such thin isolation layers may technically be applied more easily and show an improved production tolerance caused by the simplified production method. Furthermore, the intermediate layer can be made up from a heat conductive material ensuring a homogenous distribution of the temperature within those layers and also shows an improved production tolerance caused by the simplified production method.

The fifth component of the instrument according to the invention is a cooling element. The cooling element has the purpose to efficiently remove heat from the other layers, for example, the isolation layer. Therefore, the cooling element can be made from metal, e.g. aluminum, in the form of a block with a large surface to enhance flow of thermal energy into the environment. The surface can be enlarged by providing fins to a block of metal (passive cooling), optionally increasing convection around the cooling element by a fan (active cooling). Instead of fins, liquid (e.g. water) cooling can be used or an embedded (in the metal block) heat-pipe with fins at the other end can be used.

In one embodiment, the heater is protected by a cover layer on the side facing the isolation layer. This cover layer may be made from a material selected from the group of ceramics, glass ceramics and polymers; optionally it is made from glass ceramics.

A device as used with an instrument and/or the methods according to the invention is a container for keeping the mixture comprising the sample under the conditions of the method. Thus, the device should be heat resistant to the amount and to the kind of heat provided to the mixture, be resistant to the reagents contained in the mixture and be tight so that the mixture cannot escape the container.

In FIG. 1 the essential components of an exemplary instrument (1) in assembled form plus some additional features are shown. The device (2) contains the sample. It is located in close proximity to the heat transfer surface (10) of the protective cover layer of the sensor (3). The sensor element (4) separates the substrate (5) from the device. The adjacent element is the heater (6). The heater is protected by a heater cover layer (7) versus the thermal isolation layer (8) and the cooling element (9).

The use of the instrument according to the invention can include an efficient control of temperature to ensure performance of a temperature profile, for example, of repeated temperature cycles as useful for thermocycling, e.g. in PCR. The temperature and heat control can include:
  measuring the temperature of said sample in the device using the sensor element,
  comparing the temperature measured with the temperature intended to be reached in sample, and
  applying heat to the sample through the heater element to either raise the temperature, if the temperature of the sample is lower than the temperature desired, or maintain the temperature in said sample, if the temperature of the sample is the same as the temperature desired.

In one mode, therefore, the present invention comprises controlling and regulating the heating process by a computer program dependent upon the temperature of the liquid. The unit used for control of the heater is called the heat control.

Because of the flat sensor element the measurement of the temperature is very quick and does not need extensive electronics. The algorithms to compare the temperature measured with the temperature desired are also quite simple. Simple PID (proportional, integral, derivative) control algorithms known in the art are sufficient.

The heat can be applied through the heater in any known manner, e.g. by continuously applying electric current to the resistance heater or introducing said heat in pulses of electric current, e.g. by pulse width modulation, or using alternative current. Details of the length of said pulses or the amount of electric current for achieving a desired increase in temperature can be determined in simple experiments by determining the temperature in an exemplary sample and varying the amount of current and/or the length of the pulses at a given cooling capacity.

In some embodiments, this is done by using a control unit comprised in the instrument, receiving the temperature measurement values from the sensor and instructing the heater not to heat, or to heat continuously or in intervals until the temperature desired is reached. In more detail, the temperature in the liquid can be determined using the measurement with the temperature sensor in contact with the device containing the sample and knowing the physical conditions of the interaction. To control the desired temperature profile in the liquid over time the PID control algorithm will set the required heating/cooling power to achieve the proper temperature at the desired point in time taking into account also the desired temperature and the measured temperature at the least time interval. The temperature sensor in contact with the device containing the sample will measure the temperature in a known manner, i.e. proportionally to the designed lateral temperature intensity distribution over the whole contact surface with respect to the sensor in contact with the device. If a lower temperature than expected is measured at the sensor in contact with the device then the mechanical contact between the instrument and the device is considered to be insufficient. If the measured and the expected temperatures correlate to each other the mechanical contact is considered to be within working conditions. In another embodiment a second sensor element may be used to determine the temperature in the sample and to evaluate the contact between the instrument and the device. In this case the measured temperature resolution is doubled compared to embodiments using only one sensor and the risk of getting inappropriate temperatures within the sample is lowered significantly.

In some embodiments, said heating is done by contact heating. Contact heating is heating wherein the hot medium contacts the material to be heated, such that energy can flow through the contact surface between them from the heating medium to the material. The heater can be a resistive heater. Resistance heating uses the effect that the resistance of small diameter wires upon current flow leads to a loss of energy by heat. One design is a heating coil with a defined resistance for resistive heating. The coil can be formed by a wire or it can be designed in another way e.g. on a printed circuit board or as conductor of any kind of material on a substrate like ceramic or polyimide. One other option is that the coil is formed by thin or thick film technology on a suitable substrate. The coil can be located below, on top or at the sides of the receptacle or even surround the device in a way that the device is inside the coil depending on the design of the coil.

Another embodiment of the invention is a method for conducting a thermal profile in a device comprising heating and cooling the device in an instrument according to the invention.

A thermal profile is a sequence of temperatures to be reached in the sample. In some embodiments, all temperatures of said profile are located above room temperature, for example, between 37 and 98° C., or between 40 and 96° C. The profile may be a rising profile, wherein the temperatures are raised over time, or may be a descending profile, wherein the temperatures are lowered over time. In some embodiments, is a profile having maximum and minimum temperatures, i.e. with temperatures rising and dropping. In one embodiment of the invention, said thermal profile contains repeated thermocycles, as needed for PCR. Those thermocycles will include a maximum temperature allowing denaturation of double stranded nucleic acids into single strands and a minimum temperature allowing annealing of single stranded nucleic acids to double strands.

In some embodiments, the method according to the invention further comprises cooling said device by the above mentioned cooling element types. In some embodiments, said cooling is made by subjecting said instrument, for example, said cooling element, to a stream of a fluid, optionally a gas (e.g. air) for fins structures or an embedded heat-pipe.

Another embodiment of the invention is a system for determining a nucleic acid in a sample comprising an instrument according to the invention and a device containing said sample or designed for receiving said sample. This system may be used in the methods according to the invention. A system therefore conveniently comprises reagents and consumables for conducting the determination and optionally may be automated by inclusion of robotics for handling the device and/or the sample. In the system the device may be inserted to ensure proper application of electric current and cooling capacity to the components of the instrument and finally heating and cooling the device contained in the active position.

Another embodiment of the invention is a method for amplification of nucleic acids comprising providing a mixture of a liquid containing said nucleic acids in a device in an instrument according to the invention and subjecting said sample in said device to thermocycles.

Another embodiment of the invention is a system for heating a mixture containing a device containing one or more chambers for containing said mixture and an instrument according to the invention.

The following examples are offered to illustrate, but not to limit the claimed invention.

EXAMPLES

Example 1

Manufacturing an Instrument According to the Invention

In a first step a thin film temperature sensor made from platinum and available from the company Heraeus (Kleinostheim, Germany) is coated on a ceramic wafer available from the company CeramTec AG (Plochingen, Germany). As used herein, it is made from aluminium oxide and has a thickness of 635 µm. The sensor element is protected by a cover layer made up from glass ceramics and having a thickness of 20 µm. This step is performed on a coating machine known in the art. In a second manufacturing step the thick film heater is manufactured on the opposite side of the wafer. For this, a film of ruthenium oxide (thickness 20 µm) is coated on the opposite side of the wafer. The thick film layer is also protected by a cover layer made up from glass ceramics and having a thickness of 20 µm. Once the substrate is at least coated with the thin film layer it can be processed in a further step, which defines the thickness of the isolation layer and therefore the thermodynamic behavior. By screen printing methods known in the art the isolation layer is deposited in a defined shape onto the protection layer of the heater via a solution of epoxy glue available from the company Epoxy Technology Inc. (Billerica, Mass., USA) resulting in a thickness of 100 µm. The cooling block made up from copper comprising a flow through channel with an inlet and outlet for fluid cooling is contacted with the still viscous multi-compound isolation layer with glueing properties (thermal bonding). With a thermal bonding step at the temperature of 180° C. the cooling block will stick onto the heater layer side with a defined thickness of the isolation layer.

Example 2

Conducting a PCR Using the Instrument According to the Invention

Figure 2:
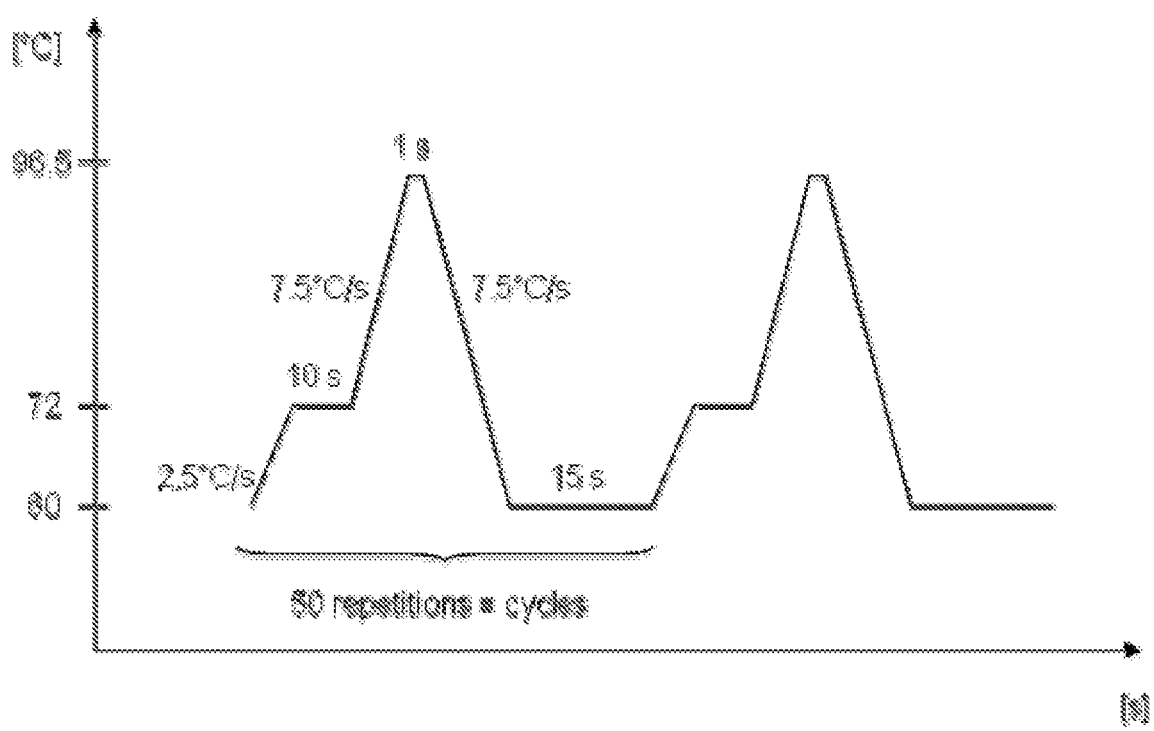
FIG. 2 depicts a temperature profile set on the instrument in order to generate a PCR curve.

Using the thermal cycler described in example 1, several PCR runs were performed with the commercially available LightCycler ParvoB19 Kit (Cat No 3 246 809, Roche Diagnostics GmbH, Germany) for real-time PCR detection, following the instructions of the manufacturer provided in the kit and using LightCycler Parvo B19 Standard as the template. The temperature profile as shown in FIG. 2 was set to generate the PCR curve.

The temperature slopes were chosen in the way that the PCR efficiency is still good, whereas the thermal cycler can manage much faster slopes, e.g. 20° C./s.

Figure 3:
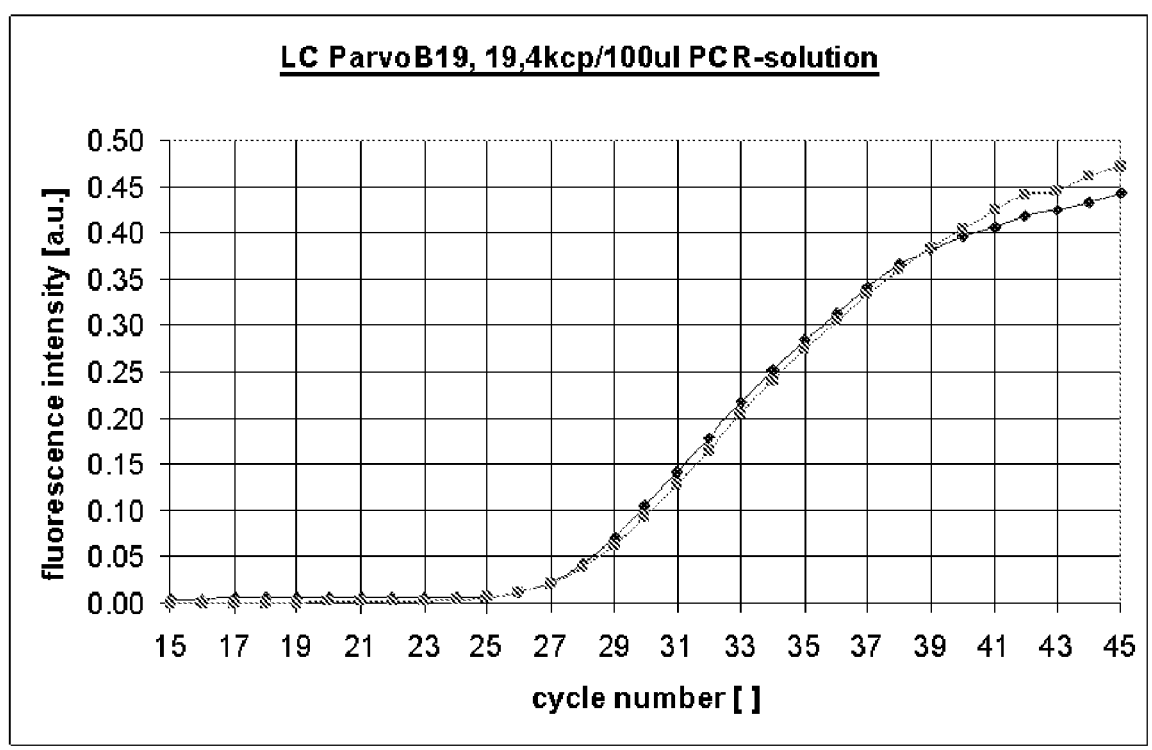
FIG. 3 shows the results of two experiments performed with an instrument according to the invention in graphic form.

The results in graphic form—measured on a breadboard with the described thermal cycler using the described temperature sensors and using a breadboard real-time fluorescence photometer capable of exciting and measuring the fluorescent substances described in the LightCycler ParvoB 19 Kit (Roche Diagnostics GmbH, Germany)—for two experiments are shown in FIG. 3.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. An instrument for heating and cooling an object in a controlled manner, said instrument comprising in the following order
    a substantially flat temperature sensor element,
    a substantially flat, rigid, heat conducting substrate,
    a substantially flat resistance heater,
    a substantially flat isolation layer, and
    a cooling element.

2. The instrument of claim 1 wherein said sensor element comprises a resistance element and a cover layer, said cover layer protecting said resistance element from direct contact with the environment and having a thickness of between 1 μm and 25 μm.

3. The instrument of claim 2, wherein said cover layer has an object contact surface reflecting a surface shape of said object and pointing towards a sensor contact surface of said object.

4. The instrument according to claim 1, wherein said sensor element is between 0.01 μm and 10 μm thick.

5. The instrument according to claim 1, wherein said heat conducting substrate has a thickness of between 0.1 mm and 10 mm.

6. The instrument according to claim 1, wherein said heat conducting substrate is made of an electrically isolating material.

7. The instrument according to claim 1, wherein said heater has a thickness of between 10 μm and 30 μm.

8. The instrument according to claim 1 further comprising a heat control.

9. A method for conducting a thermal profile in a device comprising heating the device in an instrument according to claim 1.

10. The method according to claim 9 further comprising cooling said device.

11. The method according to claim 10, wherein said cooling is made by subjecting said instrument to a stream of a fluid.

12. The method according to claim 11, wherein said fluid is a fluid or gas.

13. The method according to claim 10, wherein said steps of cooling and heating are repeated.

14. A system for determining a nucleic acid in a sample comprising an instrument according to claim 1 and a device containing said sample.

15. A method for amplification of nucleic acids comprising
    a) providing a sample containing the nucleic acids in a device in an instrument according to claim 1, and
    b) subjecting said sample in said device to thermocycles.

16. A system for heating a sample containing
    a device containing one or more chambers for containing a sample and
    an instrument according to claim 1.

* * * * *